US006971666B2

(12) United States Patent
Akiyama et al.

(10) Patent No.: US 6,971,666 B2
(45) Date of Patent: Dec. 6, 2005

(54) AIRBAG APPARATUS FOR A SMALL SIZE VEHICLE

(75) Inventors: Hideki Akiyama, Saitama (JP); Norihiro Kurata, Saitama (JP); Toshio Yamagiwa, Saitama (JP); Toyokazu Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/406,284

(22) Filed: Apr. 4, 2003

(65) Prior Publication Data

US 2003/0189323 A1 Oct. 9, 2003

(30) Foreign Application Priority Data

Apr. 5, 2002 (JP) ............................ 2002-103391

(51) Int. Cl.[7] ......................... B60R 21/24; B60R 21/22
(52) U.S. Cl. ................. 280/729; 280/730.1; 280/743.1
(58) Field of Search ............................ 280/729, 730.1, 280/743.1

(56) References Cited

U.S. PATENT DOCUMENTS 3,642,303 A * 2/1972 Irish et al. ............... 280/730.1
5,938,231 A * 8/1999 Yamazaki ................ 280/730.1
6,554,313 B2 * 4/2003 Uchida ....................... 280/729
6,786,505 B2 * 9/2004 Yoshida ...................... 280/729

FOREIGN PATENT DOCUMENTS

| | | | | |
|---|---|---|---|---|
| DE | 8508646 | * | 8/1985 | .............. 280/730.1 |
| DE | 9310544.4 | * | 7/1993 | .............. 280/730.1 |
| DE | 195 17 764 A1 | | 11/1996 | |
| DE | 197 20 622 A1 | | 1/1998 | |
| DE | 199 30 157 A1 | | 1/2001 | |
| JP | 09328053 A | | 12/1997 | |

* cited by examiner

*Primary Examiner*—Eric Culbreth

(74) *Attorney, Agent, or Firm*—Birch, Stewart, Kolasch & Birch, LLP

(57) ABSTRACT

An airbag apparatus for a small size vehicle that includes an airbag, for constraining a driver on a seat from forward motion through an inflation expansion, that reduces the number of parts and achieves miniaturization of the apparatus while constraining the driver on the seat. The airbag includes a main bag portion and an auxiliary bag portion communicating with the inside of the main bag portion through a connecting hole. The auxiliary bag portion is inflated and expanded with gas exhausted from the main bag portion through the connecting hole.

18 Claims, 7 Drawing Sheets

AIRBAG APPARATUS FOR A SMALL SIZE VEHICLE

CROSS-REFERENCE TO RELATED APPLICATIONS

The present nonprovisional application claims priority under 35 USC 119 to Japanese Patent Application No. 2002-103391 filed on Apr. 5, 2002 the entire contents thereof is hereby incorporated by reference.

BACKGROUND OF THE INVENTION

1. Field of the Invention

This invention relates to an airbag apparatus for a small size vehicle that includes an airbag, which can constrain a driver on a seat from moving forwardly through inflation expansion.

2. Description of Background Art

Conventionally, a representative example of an airbag apparatus of the type described is disclosed in, for example, Japanese Patent Laid-open No. Hei 9-328053. According to the airbag apparatus, it is possible that the gas in the airbag is completely exhausted after a primary collision. If this occurs, then the constraint of the driver may become insufficient and the airbag may be kept in a half inflated state.

With the conventional airbag apparatus described above, however, a pressure regulation valve for keeping the airbag in a half inflated state is required, and the number of parts is great.

Further, where a conventional airbag apparatus is applied to such a motorcycle of a large size as shown in FIG. 5, in order to make the constraint of the driver reliable, not only it is necessary to increase the inflation expansion capacity of the airbag 19' so that the airbag 19' is expanded to a greater range, but also it is necessary to increase the amount of gas to be blown into the airbag 19' and also the size of some other components such as an inflator is increased.

SUMMARY AND OBJECTS OF THE INVENTION

It is an object of the present invention to provide an airbag apparatus for a small size vehicle wherein an increase of the number of parts is prevented and miniaturization of the apparatus is achieved while constraining a driver on a seat.

In order to attain the object described above, an airbag apparatus for a small size vehicle which includes an airbag which can constrain a driver on a seat from forward motion through an inflation expansion. The airbag includes a main bag portion and an auxiliary bag portion communicating with the inside of the main bag portion through a connecting hole, and the auxiliary bag portion is inflated and expanded with gas exhausted from the main bag portion through the connecting hole.

According to the configuration of the present invention, upon inflation expansion of the airbag, the main bag portion is inflated and expanded first and then the auxiliary bag portion is inflated and expanded with gas exhausted from the main bag portion through the connecting hole and the force of the driver pushing the main bag portion. Consequently, while the amount of gas to be blown into the airbag can be set to a comparatively small amount necessary only for an inflation expansion of the main bag portion, the airbag can be expanded to a comparatively great range by the main bag portion and the auxiliary bag portion. Further, since a part for exclusive use for expanding the airbag to a great extent is not required, an increase in the number of parts can be prevented and miniaturization of the apparatus, particularly miniaturization of the inflator, can be achieved while constraining the driver on the seat.

Further, according to the present invention, the airbag apparatus for a small size vehicle includes an exhaust hole having a smaller diameter than that of the connecting hole in the auxiliary bag portion. According to the configuration just described, gas can be circulated smoothly from the main bag portion to the auxiliary bag portion, and an inflation expansion of the auxiliary bag portion after inflation expansion of the main bag portion can be made reliable.

Furthermore, according to the present invention, the airbag apparatus for a small size vehicle includes at least a portion of the airbag which can contact with the driver on the seat that is formed from a material having a high coefficient of friction. Thus, the constraining effect of the driver by the airbag can be further promoted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention is described based on a working example of the present invention as illustrated in FIGS. 1 to 4.

Figure 1:
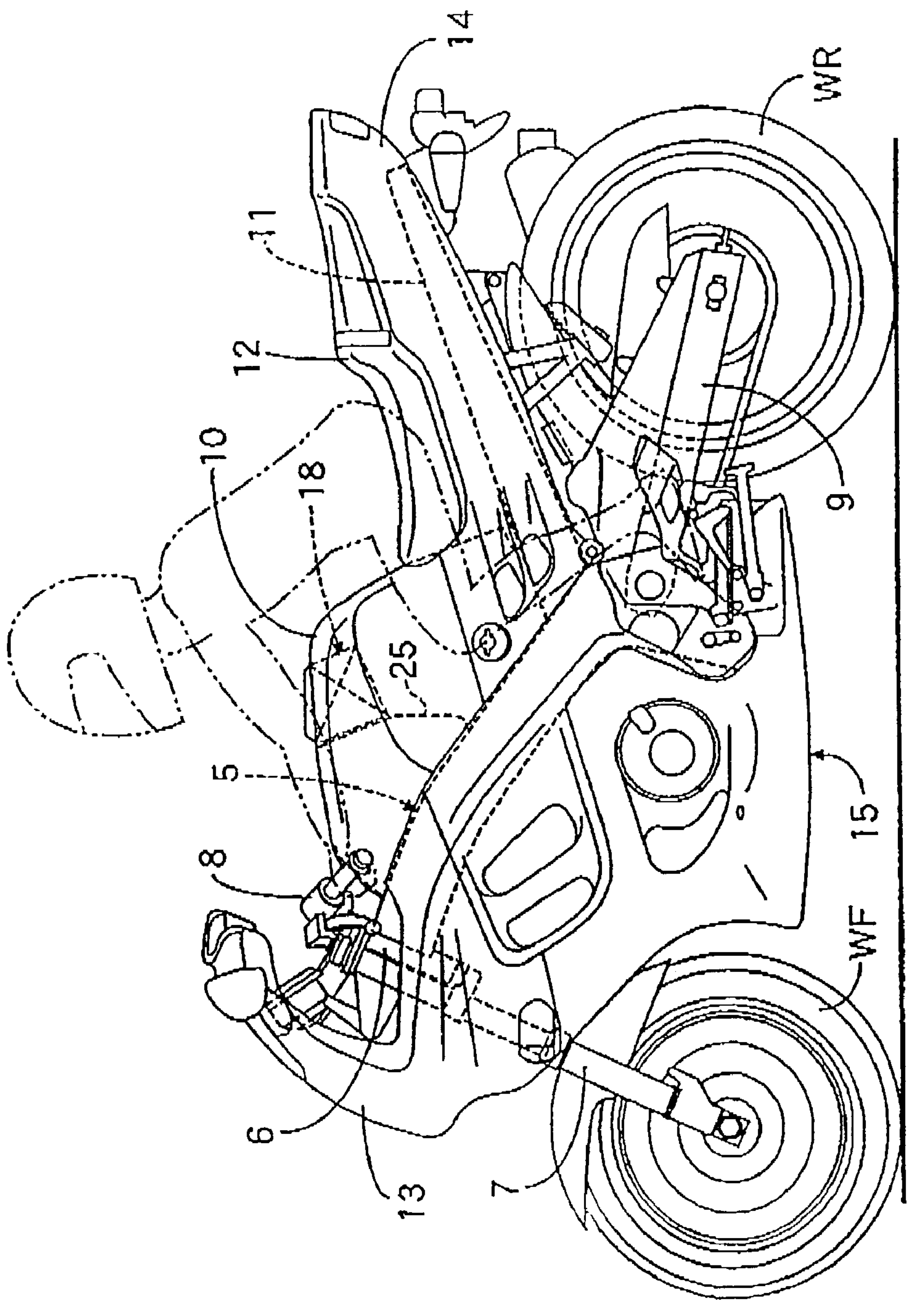
FIG. 1 is a side elevational view of a motorcycle.

Referring first to FIG. 1, a front fork 7 is supported for a steering motion on a head pipe 6 provided at a front end of a body frame 5 of the motorcycle, and a front wheel WF is supported for rotation at a lower end of the front fork 7 while a steering handle bar 8 is connected to an upper portion of the front fork 7. Further, a swing arm 9 is supported for upward and downward rocking motion at a rear portion of the body frame 5, and a rear wheel WR is supported for rotation at a lower end of the swing arm 9.

A dummy tank 10 is carried at a front half portion of the body frame 5 and is formed in a shape the same as that of a conventional fuel tank. A seat rail 11 is provided at a rear end portion of the body frame 5, and a seat 12 of the tandem type is disposed rearwardly of the dummy tank 10 for upward and downward motion on the seat rail 11.

Most of the parts of the body frame 5 are covered with a body cover 15 made a synthetic resin and composed of a front cowl 13 and a rear cowl 14.

Figure 2:
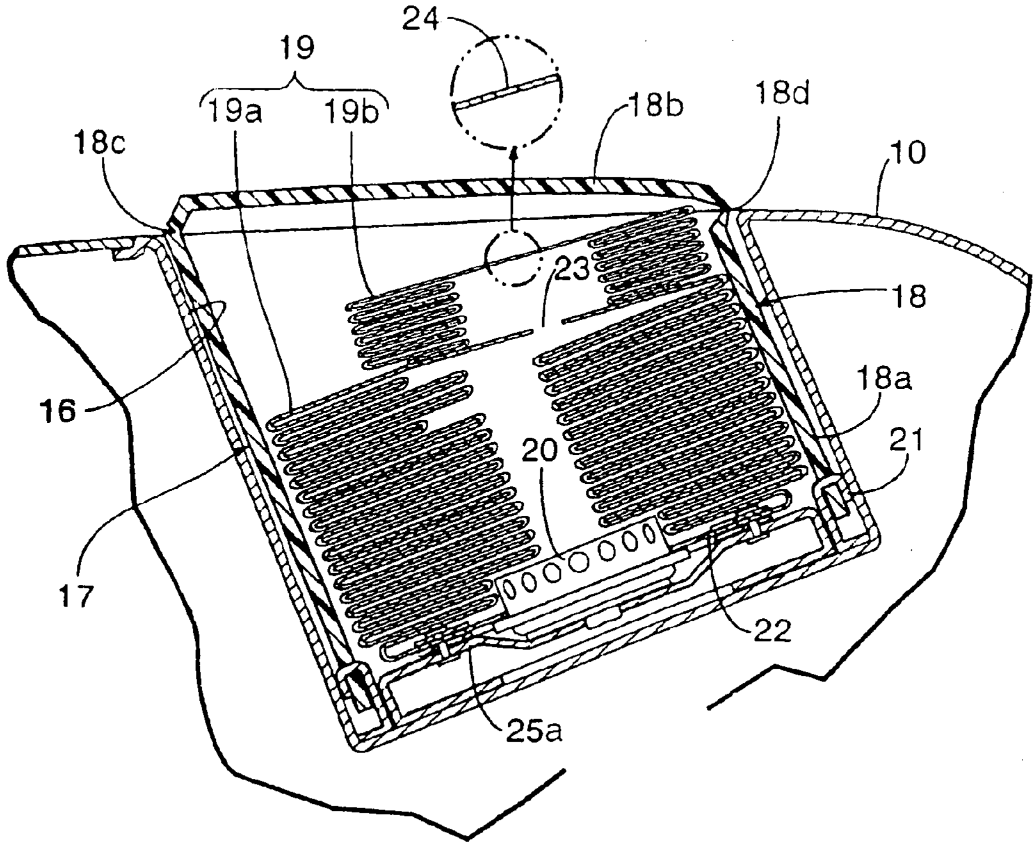
FIG. 2 is an enlarged vertical sectional view of an airbag module.

Referring also to FIG. 2, an accommodation recess 16 is provided at a rear portion of the dummy tank 10 such that it is open upwardly. An airbag module 17 of the airbag module is accommodated in the accommodation recess 16.

The airbag module 17 includes an airbag housing 18, an airbag 19 accommodated in the airbag housing 18, and an inflator 20 for generating gas for inflating and expanding the airbag 19.

The airbag housing 18 is formed in a cup shape from a light material such as a synthetic resin material and has an accommodation tubular portion 18*a* for being accommodated in the accommodation recess 16 such that the airbag 19 can be accommodated therein in a folded state. A lid portion 18*b* is provided for closing an upper end opening of the accommodation tubular portion 18*a*. The airbag housing 18 is attached at a lower portion of the accommodation tubular portion 18*a* thereof to the dummy tank 10 by mounting pieces 21 secured to the dummy tank 10.

The lid portion 18*b* is connected to the accommodation tubular portion 18*a* through a hinge portion 18*c* disposed at a location around the lid portion 18*b*, for example, at a location on the opposite side to the seat 12 and a fragile portion 18*d* disposed at a portion of the periphery of the lid portion 18*b* except the hinge portion 18*c*. The fragile portion 18*d* is formed such that it can be broken readily.

The airbag 19 includes a main bag portion 19*a* formed as a bag having an opening 22 at a lower face thereof and an auxiliary bag portion 19*b* communicating with the inside of the main bag portion 19*a* through a connecting hole 23. An exhaust hole 24 is provided in the auxiliary bag portion 19*b*.

The connecting hole 23 introduces gas exhausted from the main bag portion 19*a* therethrough to inflate and expand the auxiliary bag portion 19*b*, and the exhaust hole 24 is formed with a diameter smaller than that of the connecting hole 23.

Figure 6:
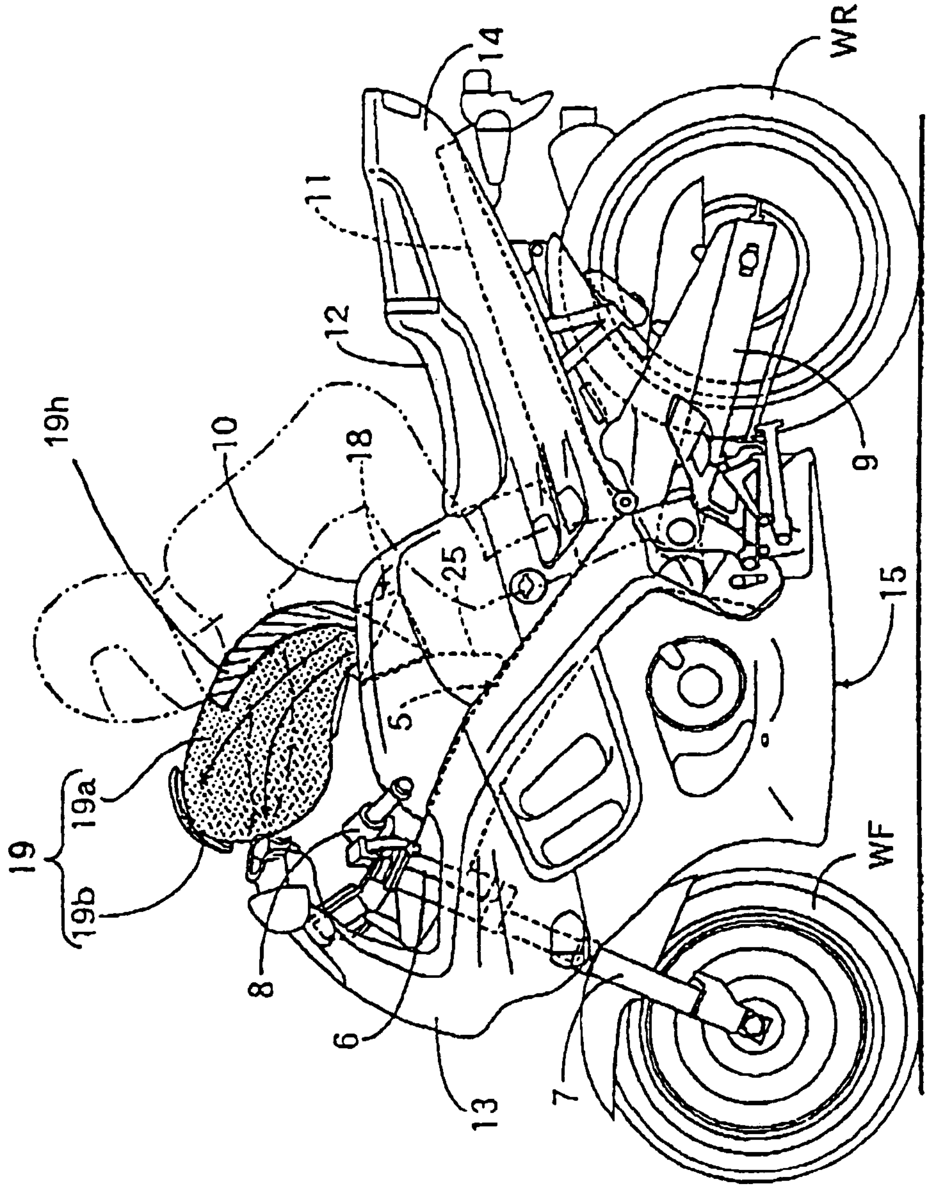
FIG. 6 is the side elevational view of the motorcycle shown in FIG. 3, and provides a schematic showing of the material having a high coefficient of friction.
Figure 7:
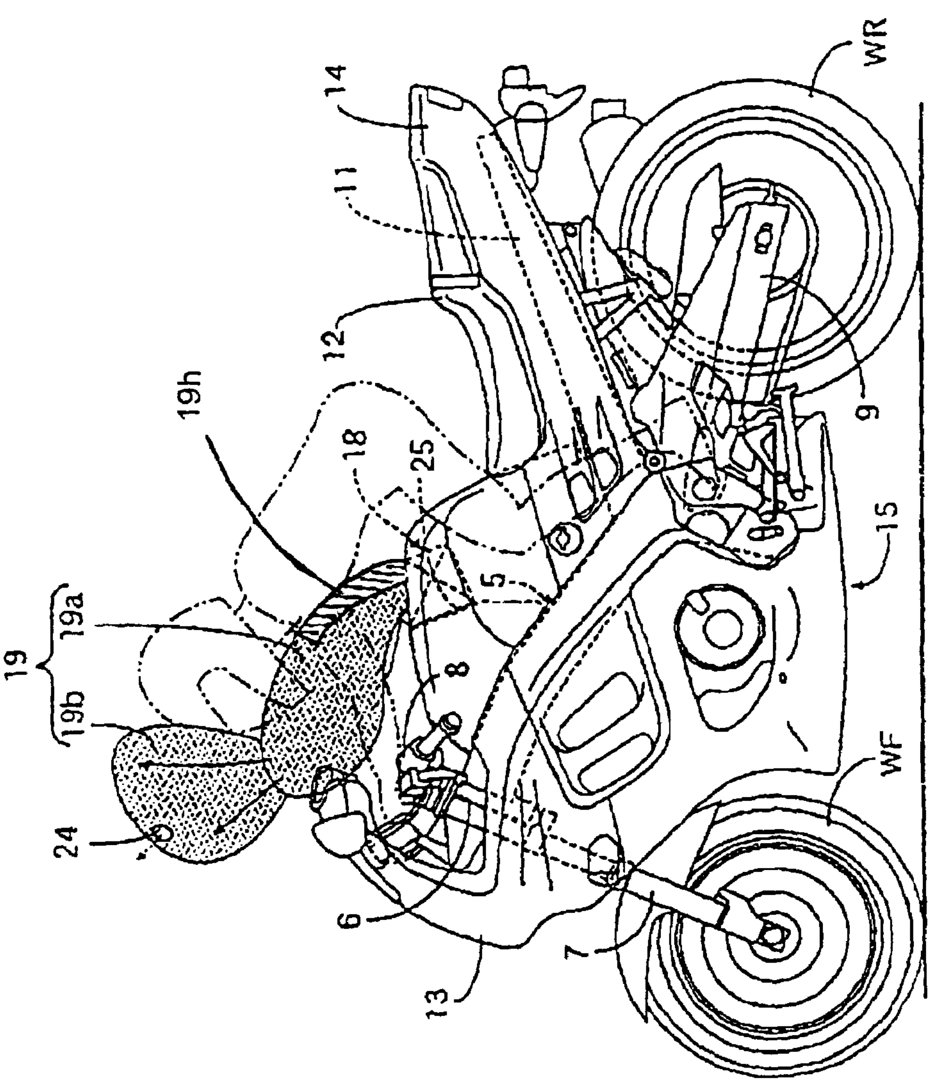
FIG. 7 is the side elevational view of the motorcycle shown in FIG. 4, and provides a schematic showing of the material having a high coefficient of friction.

At least a portion of the airbag 19 that can contact with a region of the driver positioned on the seat 12, except for the driver's face or head, is formed from a material having a high coefficient of friction such as rubber or a coarse material. FIGS. 6 and 7 are schematic showings of the portion of airbag 19 formed of material 19*h* having a high coefficient of friction.

The airbag 19 is accommodated in a folded state in the airbag housing 18. Meanwhile, the inflator 20 is supported by a mouse ring 25*a* securely attached to the opening 22 on the lower face of the airbag 19, the airbag 19 being accommodated in the airbag housing 18 which is supported fixedly to the mounting pieces 21 secured to the dummy tank 10.

An impact detection sensor (not shown) such as an acceleration sensor is attached to the body frame 5. In response to detection of an impact higher than a predetermined value by the impact detection sensor, the inflator 20 operates to supply high pressure gas into the airbag 19.

In addition, a baggage accommodation box 25 (refer to FIG. 1) is provided at a portion of the dummy tank 10 except for the location wherein the airbag module 17 is disposed. By opening or closing a lid (not shown) provided for opening and closing movement on the dummy tank 10, baggage can be placed into and removed from the baggage accommodation box 25.

Subsequently, operation of the present working example is described. The airbag 19 includes the main bag portion 19*a* and the auxiliary bag portion 19*b* communicating with the inside of the main bag portion 19*a* through the connecting hole 23. The auxiliary bag portion 19*b* is inflated and expanded with gas exhausted from the main bag portion 19*a* through the connecting hole 23.

Figure 3:
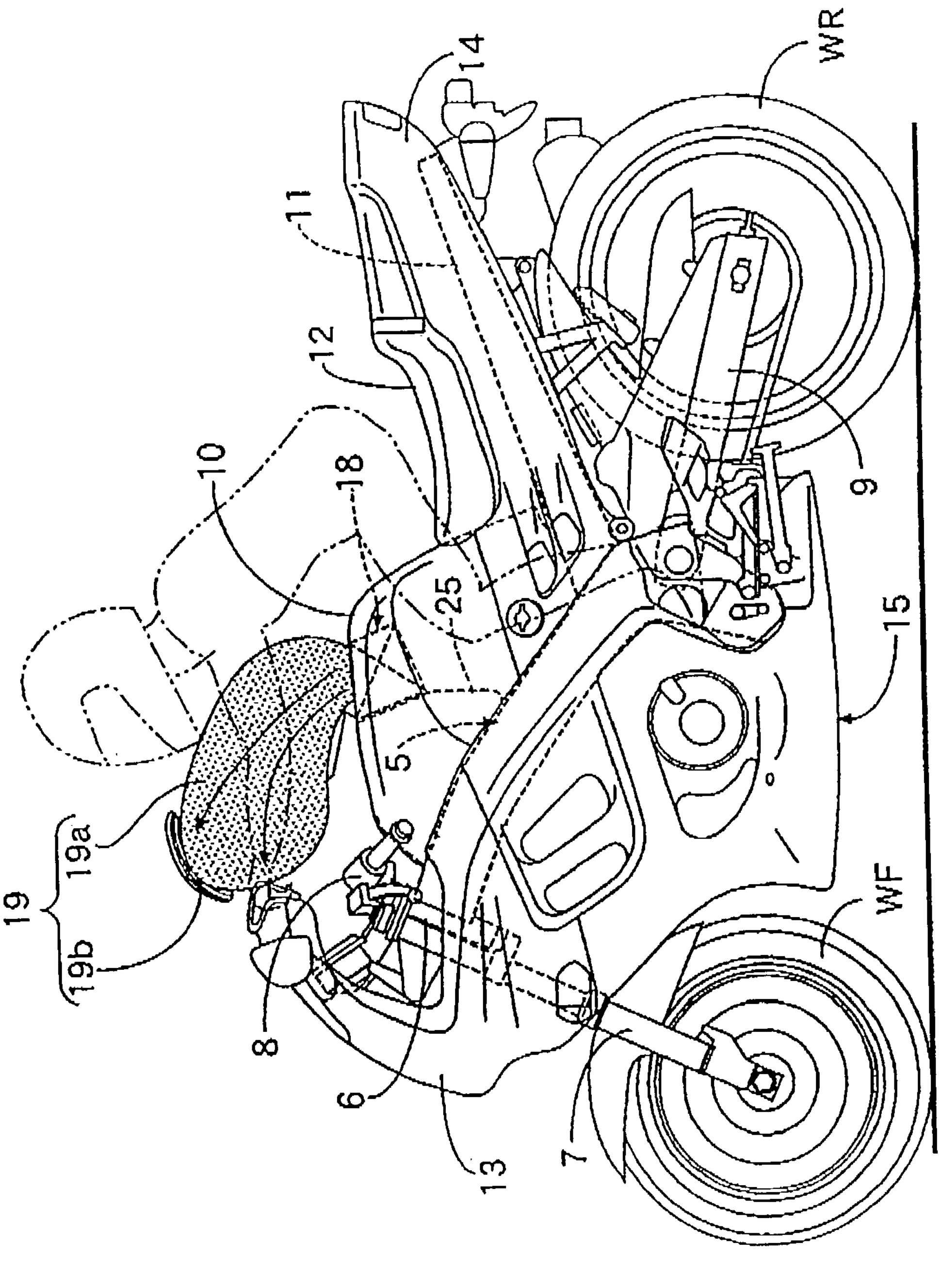
FIG. 3 is a side elevational view of the motorcycle in a state wherein a main bag portion of an airbag is inflated and expanded.

Accordingly, when the inflator 20 operates in response to the detection of an impact higher than the predetermined value by the impact detection sensor upon collision or the like and high pressure gas is supplied into the airbag 19, first the main bag portion 19*a* of the airbag 19 breaks the fragile portion 18*d* of the airbag housing 18 and inflates upwardly in an instant while opening the lid portion 18*b* as shown in FIGS. 3 and 6. Consequently, the driver positioned on the seat 12 is constrained from forward motion by the inflated and expanded main bag portion 19*a*.

Figure 4:
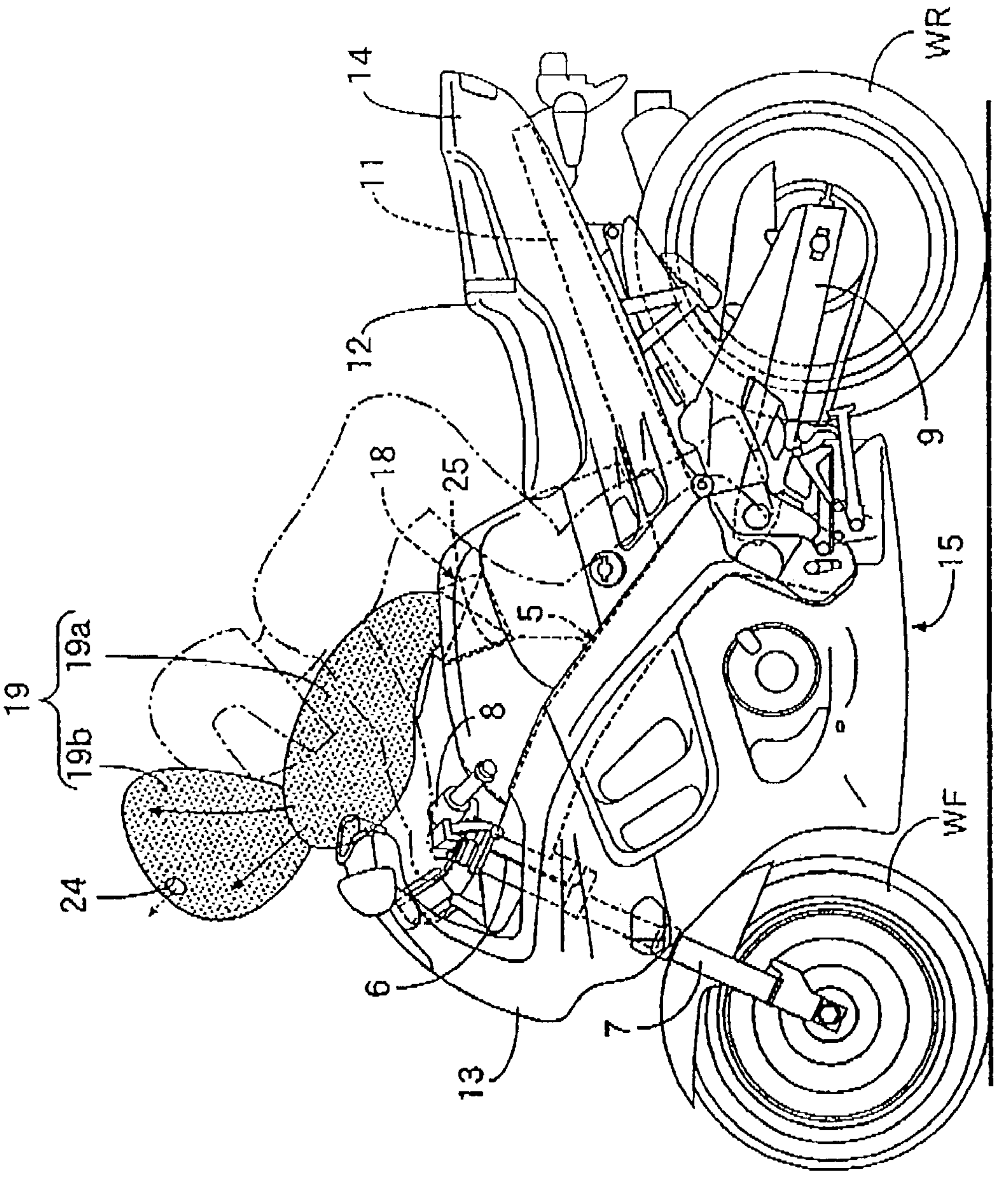
FIG. 4 is a side elevational view of the motorcycle in another state wherein an auxiliary bag portion of the airbag is inflated and expanded.
Figure 5:
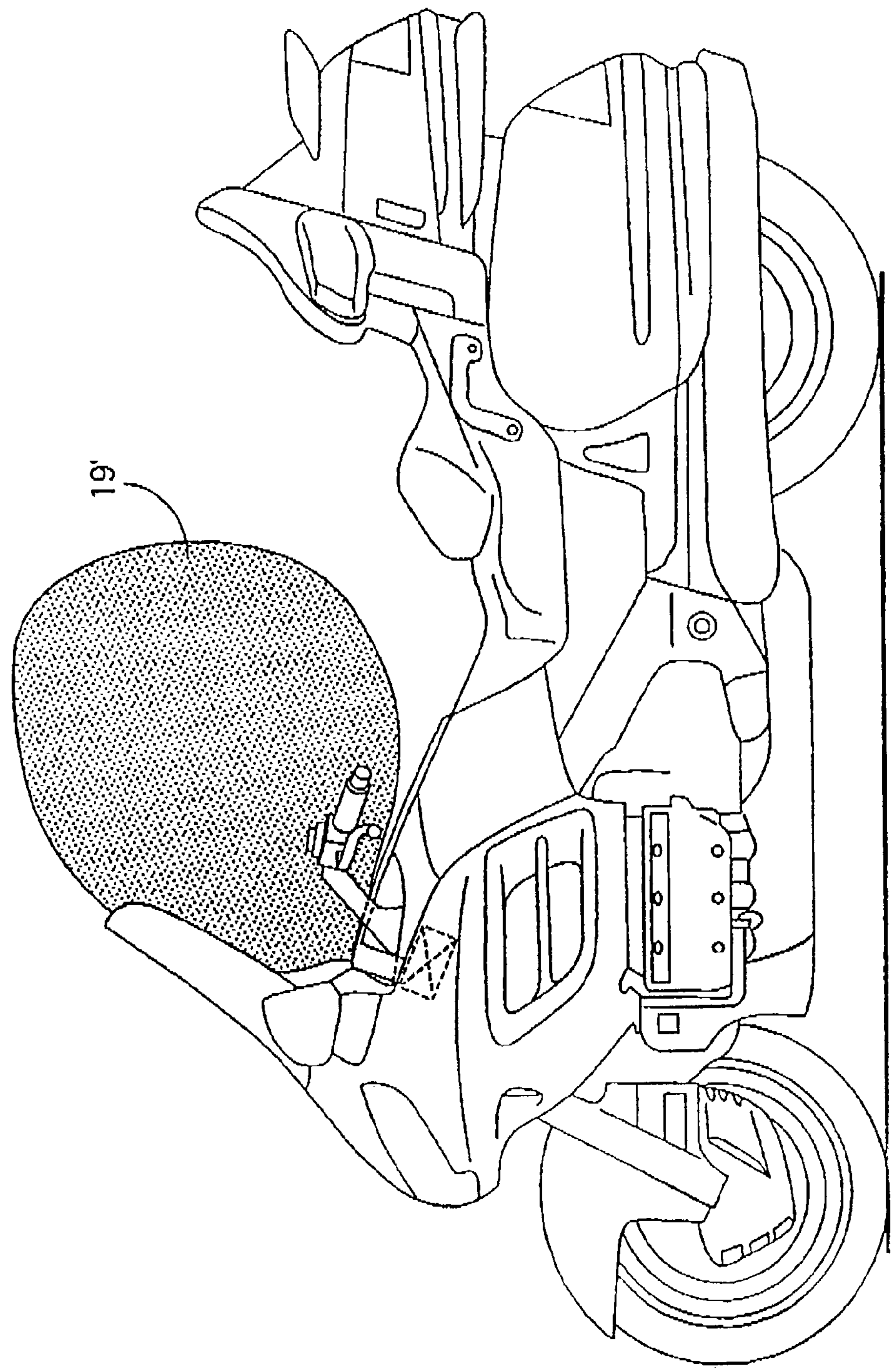
FIG. 5 is a side elevational view of a motorcycle of a large size in which a conventional airbag apparatus is incorporated.

Then, the auxiliary bag portion 19*b* is inflated and expanded as shown in FIGS. 4 and 7 by gas exhausted from the main bag portion 19*a* through the connecting hole 23 and the force pushing the main bag portion 19*a* by the driver. Consequently, while the amount of gas to be blown into the airbag 19 can be set to a comparatively small amount only necessary for inflation expansion of the main bag portion 19*a*, the airbag 19 can be expanded to a comparatively great range by the main bag portion 19*a* and the auxiliary bag portion 19*b*.

Upon an inflation expansion of the airbag 19, the main bag portion 19*a* is inflated and expanded first and then the auxiliary bag portion 19*b* is inflated and expanded with gas exhausted from the main bag portion 19*a* through the connecting hole 23 in this manner. While the amount of gas to be blown into the airbag 19 from the inflator 20 can be set to a comparatively small amount necessary only for inflation expansion of the main bag portion 19*a*, the airbag 19 can be expanded to a comparatively greater range by the main bag portion 19*a* and the auxiliary bag portion 19*b*. Further, since a part for exclusive use for expanding the airbag 19 to a great extent is not required, an increase in the number of parts can be prevented and miniaturization of the apparatus, particularly miniaturization of the inflator 20, can be achieved while constraining the driver on the seat 12.

Further, since the exhaust hole 24 having a diameter smaller than that of the connecting hole 23 which interconnects the main bag portion 19*a* and the auxiliary bag portion 19*b* is provided in the auxiliary bag portion 19*b*, gas can be circulated smoothly from the main bag portion 19*a* to the auxiliary bag portion 19*b* and inflation expansion of the auxiliary bag portion 19*b* after inflation expansion of the main bag portion 19*a* can be made reliable.

Furthermore, since at least a portion of the airbag 19 that can contact with a region of the driver on the seat 12, except for the driver's face or head, is formed from a material having a high coefficient of friction, the constraining effect of the driver by the airbag 19 can be further promoted.

While the working example of the present invention is described above, the present invention is not limited to the working example described above and various design alterations can be made without departing from the present invention recited in the claims.

Further, the present invention can be applied widely not only to a motorcycle of the working example described above but also to small size vehicles such as a scooter type motorcycle or a motor tricycle.

As described above, according to the present invention, an increase in the number of parts can be prevented and miniaturization of the apparatus, particularly miniaturization of the inflator, can be achieved while constraining the driver on the seat.

Further, gas can be circulated smoothly from the main bag portion to the auxiliary bag portion and inflation expansion of the auxiliary bag portion after an inflation expansion of the main bag portion can be made reliable.

Furthermore, the constraining effect of the driver by the airbag can be further promoted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag apparatus for a vehicle which includes an airbag for constraining a driver on a seat from forward motion through an inflation expansion of the airbag, comprising:

a main bag portion and an auxiliary bag portion; and a connecting hole for communicating with an inside of said main bag portion wherein said auxiliary bag portion is inflated and expanded with gas exhausted from said main bag portion through said connecting hole, and when the main air bag portion and the auxiliary bag portion are both inflated and expanded, the auxiliary bag portion is positioned further in a forward and upward direction than is the main bag portion.

wherein the auxiliary bag portion constrains the driver after the main bag portion initially constrains the driver.

2. The airbag apparatus for a vehicle according to claim 1, wherein an exhaust hole having a smaller diameter than that of said connecting hole is provided in said auxiliary bag portion.

3. The airbag apparatus for a vehicle according to claim 2, wherein at least a portion of said airbag for contacting with the driver on said seat is formed from a material having a higher coefficient of friction than other portions of said airbag which the driver does not contact.

4. The airbag apparatus for a vehicle according to claim 1, wherein an upper section of the auxiliary air bag portion inflates to have a larger forward-to-rear dimension than does a lower section of the auxiliary air bag portion.

5. The airbag apparatus for a vehicle according to claim 1, and further including an airbag module disposed in a forward position on said vehicle for storing the airbag during non-use.

6. The airbag apparatus for a vehicle according to claim 5, and further including a cover member disposed to cover said airbag module when said airbag is stored therein.

7. The airbag apparatus for a vehicle according to claim 5, and further including a tank disposed in a forward position of said vehicle wherein said airbag module is disposed within said tank.

8. The airbag apparatus for a vehicle according to claim 7, and further including mounting pieces secured to said tank and in engagement with a lower portion of said main bag for securing said main bag relative to said tank.

9. The airbag apparatus for a vehicle according to claim 1, wherein prior to expansion of the auxiliary bag portion, the driver on the seat is initially constrained by the main bag portion during the forward motion.

10. An airbag for a vehicle for constraining a driver on a seat from forward motion through an inflation expansion of the airbag, comprising:

a main bag portion being of a first predetermined size and including an interior portion for receiving a gas for expansion of said main bag portion;

an auxiliary bag portion being mounted relative to said main bag portion and being of a second predetermined size, said auxiliary bag portion including an interior portion; and a connecting hole for communicating gas contained within the interior portion of the main bag portion with the interior portion of the auxiliary bag portion;

wherein said auxiliary bag portion is inflated and expanded with gas exhausted from said main bag portion through said connecting hole, and when inflated the auxiliary air bag portion extends in a direction substantially upward and forward with respect to the main air bag portion, and wherein the auxiliary bag portion constrains the driver after the main bag portion initially constrains the driver.

11. The airbag apparatus for a vehicle according to claim 10, wherein an exhaust hole having a smaller diameter than that of said connecting hole is provided in said auxiliary bag portion.

12. The airbag apparatus for a vehicle according to claim 10, wherein at least a portion of said airbag for contacting with the driver on said seat is formed from a material having a higher coefficient of friction than other portions of said airbag which the driver does not contact.

13. The airbag apparatus for a vehicle according to claim 10, wherein an upper section of the auxiliary air bag portion inflates to have a larger forward-to-rear dimension than does a lower section of the auxiliary air bag portion.

14. The airbag apparatus for a vehicle according to claim 10, and further including an airbag module disposed in a forward position on said vehicle for storing the airbag during non-use.

15. The airbag apparatus for a vehicle according to claim 14, and further including a cover member disposed to cover said airbag module when said airbag is stored therein.

16. The airbag apparatus for a vehicle according to claim 14, and further including a tank disposed in a forward position of said vehicle wherein said airbag module is disposed within said tank.

17. The airbag apparatus for a vehicle according to claim 16, and further including mounting pieces secured to said tank and in engagement with a lower portion of said main bag for securing said main bag relative to said tank.

18. An airbag apparatus for a vehicle which includes an airbag for constraining a driver on a seat from forward motion through an inflation expansion of the airbag, comprising:

a main bag portion and an auxiliary bag portion; and a connecting hole for communicating with an inside of said main bag portion;

wherein upon inflating said main air bag portion, said connecting hole is positioned at an arc-shaped section of the main air bag portion which faces in an upward and forward direction, and said auxiliary bag portion is inflated and expanded with gas exhausted from said main bag portion through said connecting hole, and wherein the auxiliary bag portion constrains the driver after the main bag portion initially constrains the driver, wherein prior to expansion of the auxiliary bag portion, the driver on the seat is initially constrained by the main bag portion during the forward motion.

* * * * *